US010779006B2

(12) United States Patent
Hendry et al.

(10) Patent No.: US 10,779,006 B2
(45) Date of Patent: Sep. 15, 2020

(54) SIGNALING 360-DEGREE VIDEO INFORMATION

(71) Applicant: QUALCOMM Incorporated, San Diego, CA (US)

(72) Inventors: Fnu Hendry, San Diego, CA (US); Muhammed Zeyd Coban, Carlsbad, CA (US); Geert Van der Auwera, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/274,674

(22) Filed: Feb. 13, 2019

(65) Prior Publication Data

US 2019/0253733 A1    Aug. 15, 2019

Related U.S. Application Data

(60) Provisional application No. 62/630,701, filed on Feb. 14, 2018.

(51) Int. Cl.
*H04N 19/184* (2014.01)
*H04N 19/70* (2014.01)
*H04N 19/136* (2014.01)
*H04N 19/597* (2014.01)

(52) U.S. Cl.
CPC ......... *H04N 19/597* (2014.11); *H04N 19/136* (2014.11); *H04N 19/184* (2014.11); *H04N 19/70* (2014.11)

(58) Field of Classification Search
CPC .... H04N 19/597; H04N 19/136; H04N 19/70; H04N 19/184
USPC .................................................. 375/240.15
See application file for complete search history.

(56) References Cited

U.S. PATENT DOCUMENTS

| | | | |
|---|---|---|---|
| 2015/0103925 A1* | 4/2015 | Chen .................... | H04N 19/463 375/240.26 |
| 2017/0323423 A1* | 11/2017 | Lin ....................... | H04N 13/139 |
| 2017/0332107 A1* | 11/2017 | Abbas .................... | H04N 19/82 |
| 2017/0339391 A1* | 11/2017 | Zhou ................. | H04N 21/21805 |
| 2017/0339392 A1* | 11/2017 | Forutanpour ........ | H04N 19/597 |
| 2018/0374192 A1* | 12/2018 | Kunkel ................. | G06T 15/205 |

OTHER PUBLICATIONS

International Search Report and Written Opinion—PCT/US2019/018072—ISA/EPO—dated May 22, 2019, 15 Pages.

(Continued)

*Primary Examiner* — Jared Walker
(74) *Attorney, Agent, or Firm* — Shumaker & Sieffert, P.A.

(57) ABSTRACT

This disclosure describes techniques for signaling 360-degree video information in syntax structures. As one example, this disclosure describes examples for signaling projection types and related information for 360-degree video in syntax structures that include one or more syntax elements. In some examples, the same syntax structures may include non-360-degree video information as well. Accordingly, the syntax structure may be used for encoding and decoding a bitstream carrying only non-360-degree video data, only 360-degree video data, or both non-360-degree video data and 360-degree video data.

30 Claims, 6 Drawing Sheets

(56) References Cited

OTHER PUBLICATIONS

Fogg (Movielabs) C: "Elementary Bitstream Omni-Directional Video Indicators for Web Applications", 26. JCT-VC Meeting; Dec. 1, 2017- Jan. 20, 2017; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-Z0030-v2, Jan. 18, 2017 (Jan. 18, 2017), XP030118137, 8 Pages.

Hanhart P., et al., "AHG8: High Level Syntax Extensions for Signaling of 360-Degree Video Information", 4. JVET Meeting, Oct. 15, 2016-Oct. 21, 2016, Chengdu, (The Joint Video Exploration Team of ISO/IEC JTC1/SC29/WG11 and ITU-T SG.16 ), URL: http://phenix.int-evry.fr/jvet/,, No. JVET-D0093, Oct. 6, 2016 (Oct. 6, 2016), XP030150330, 6 Pages.

ITU-T H.261, Line Transmission of Non-Telephone Signals, Video Codec for Audiovisual Services at p x 64 kbits, The International Telecommunication Union, Mar. 1993, 29 pp.

ITU-T H.262 (Feb. 2000), "Information Technology—Generic Coding of Moving Pictures and Associated Audio Information: Video", Series H: Audiovisual and Multimedia Systems, Infrastructure of Audiovisual Services—Coding of Moving Video, Feb. 2000, 220 pages.

ITU-T H.263, Series H: Audiovisual and Multimedia Systems, Infrastructure of audiovisual services—Coding of moving video, Video coding for low bit rate communication, The International Telecommunication Union. Jan. 2005, 226 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, "Series H: Audiovisual and Multimedia Systems, Infrastructure of audiovisual services—Coding of moving video, High efficiency video coding," The International Telecommunication Union. Dec. 2016, 664 pp.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

Ergen S., "ZigBee/IEEE 802.15.4 Summary", Sep. 10, 2004, 37 pp.

Skupin R., et al., "Standardization Status of 360 degree Video Coding and Delivery", 2017 IEEE Visual Communications and Image Processing (VCIP), Retrieved from Internet on Feb 14, 2018, URL: <http:iphome.hhi.de/skupin/assets/pdfs/VCIP2017_360_standardisation_status_camready_final.pdf, 4 pages.

Chen Y., et al., "Description of SDR, HDR and 360° video coding technology proposal by Qualcomm and Technicolor—low and high complexity versions," 10th Meeting: San Diego, CA, Apr. 10-20, 2018, (Joint Video Exploration Team (JVET) of ITU-T SG 16 WP 3 and ISO/IEC JTC 1/SC 29/WG 11, JVET-J0021, 43 pages.

\* cited by examiner

SIGNALING 360-DEGREE VIDEO INFORMATION

This application claims the benefit of U.S. Provisional Application No. 62/630,701, filed Feb. 14, 2018, the entire contents of which are incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for signaling 360-degree video information in syntax structures. As one example, this disclosure describes examples for signaling projection types and related information for 360-degree video in syntax structures that include one or more syntax elements. In some examples, the same syntax structures may include non-360-degree video information as well.

In one example, the disclosure describes a method of decoding video data, the method comprising receiving, as part of a syntax structure, information indicating that a coded bitstream includes 360-degree video, receiving information for the 360-degree video based on the reception of the information that the coded bitstream includes 360-degree video, receiving, as part of the same syntax structure, information for non-360-degree video, and decoding the 360-degree video and the non-360-degree video.

In one example, the disclosure describes a method of encoding video data, the method comprising signaling, as part of a syntax structure, information indicating that a coded bitstream includes 360-degree video, signaling information for the 360-degree video based on the coded bitstream including 360-degree video, signaling, as part of the same syntax structure, information for non-360-degree video, and encoding the 360-degree video and the non-360-degree video.

In one example, the disclosure describes a device for decoding video data, the device comprising a memory configured to store video data and a video decoder comprising one or more processing units implemented in fixed-function or programmable circuitry. The video decoder is configured to receive, as part of a syntax structure stored as video data in the memory, information indicating that a coded bitstream includes 360-degree video, receive information for the 360-degree video based on the reception of the information that the coded bitstream includes 360-degree video, receive, as part of the same syntax structure, information for non-360-degree video, and decode the 360-degree video and the non-360-degree video.

In one example, the disclosure describes a computer-readable storage medium storing instructions thereon that when executed cause one or more processors of a device for decoding video data to receive, as part of a syntax structure, information indicating that a coded bitstream includes 360-degree video, receive information for the 360-degree video based on the reception of the information that the coded bitstream includes 360-degree video, receive, as part of the same syntax structure, information for non-360-degree video, and decode the 360-degree video and the non-360-degree video.

The details of one or more examples are set forth in the accompanying drawings and the description below. Other features, objects, and advantages will be apparent from the description, drawings, and claims.

DETAILED DESCRIPTION

Figure 1:
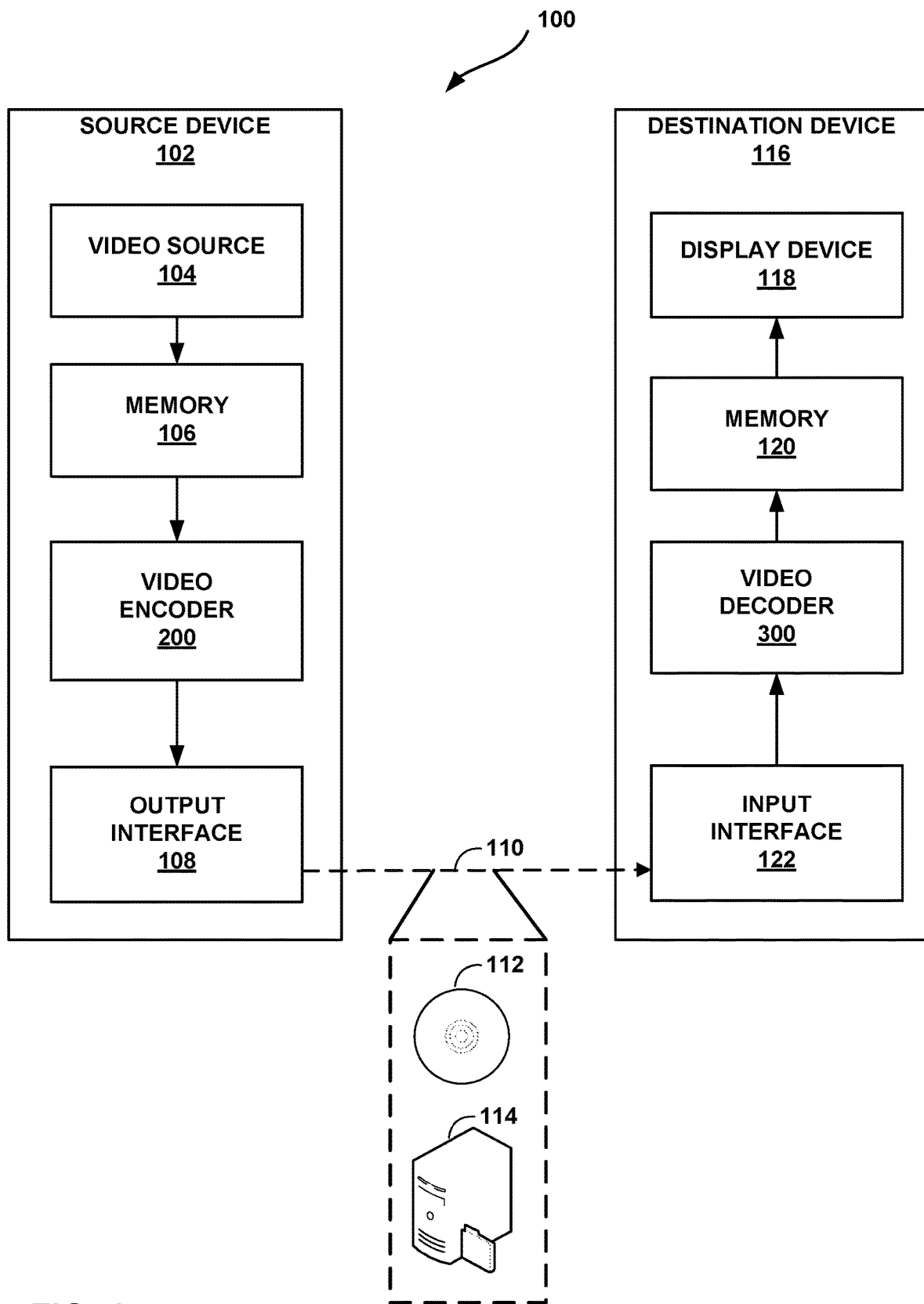
FIG. 1 is a block diagram illustrating an example video encoding and decoding system that may perform the techniques of this disclosure.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC) with its extensions. The latest draft of the H.265 specification is: ITU-T H.265, Series H: Audiovisual and Multimedia Systems, Infrastructure of audiovisual services—Coding of moving video, Advanced video coding for generic audiovisual services, The International Telecommunication Union. December 2016, and herein referred to as H.265 or HEVC.

For next generation video coding, a number of methods for coding of 360-degree video are being develop together with methods for coding of non-360-degree video. Encoding and decoding of 360-degree video may be different from that of for non-360-degree video as encoding and decoding of 360-degree video may require different set of coding tools, different pre-processing requirements, and different post processing requirements.

In this disclosure, 360-degree video may refer to examples where there is image content captured in viewing angles all round a video content capture device. For example, the captured image content may be considered as a sphere of image content, and a viewer can view the image content from virtually any angle. In this disclosure, 360-degree video should not be considered limited to full 360-degree video. In general, 360-degree video refers to example encoded and decoded video content that includes and extends beyond the periphery of where a viewer is currently viewing image content (referred to as a viewport). 360-degree video may allow a viewer to look above, below, left, or right of the viewport. The viewport may form a subset of all the video content. Hence, in 360-degree video, the encoding and decoding may include encoding and decoding of video content that goes outside the viewport so that such video content is available to the viewer when he or she determines to view video content outside the viewport.

In this disclosure, non-360-degree video may refer to examples where the encoded and decoded video content is for a fixed viewer perspective. As one example, in rectangular video, the viewer perspective is fixed, and the viewer may not be able to view image content above, below, left, or right of the rectangular video that is being displayed (e.g., in the viewport). Hence, in non-360-degree video, the encoding and decoding may not include encoding and decoding of video content that goes outside the viewport because video content outside of the viewport need not be available to the viewer.

Accordingly, for 360-degree video, additional pre- and post-processing operations may be needed. As one example, encoder pre-processing includes stitching and projecting of video content of the different viewing perspectives, and decoder post-processing may include the corresponding steps for rendering. For instance, processing of 360-degree video may include conversion or projection of video content into certain type of projection type such as equiretangular projection (ERP), cubemap projection (CMP) and its derivative projections such as adjusted cubemap (ACP) and equatorial cylindrical projection (ECP). Such projection information is signaled from a video encoder to a video decoder, which may be used by 360-degree video specific coding tools and/or 360-degree video specific post processing. Also, for 360-degree video, there may be additional signaling of projection metadata and the like.

As one example, "360-degree video data" may include a frame having a plurality of regions corresponding to intersecting, orthogonal planes of a cube map projection. For instance, in some examples, the frame being encoded by the video encoder or being decoded by a video decoder is a flat two-dimensional (2D) image. However, the content of the 2D image includes image content external to the viewport such as regions that form different planes of the example projections. In some examples, "non-360-degree video data" may also a flat 2D image but does not include regions outside the viewport. The above example description of differences in 360-degree video and non-360-degree video are provided simply to assist with understanding and should not be considered limiting. In general, 360-degree video data processing provides for encoding and decoding video data that is external to a current viewport of the viewer allowing the viewer to see video content above, below, in front, behind, to the left, and/or to the right of the current viewport. Non-360-degree video data processing, however, may be limited to the current viewport, possibly with some external periphery information for coding but insufficient to allow the viewer to video content above, below, in front, behind, to the left, and/or to the right of the current viewport.

An example technological problem in the field of video coding (e.g., encoding or decoding) may be that signaling information for 360-degree video should be done in such a way to be compatible with non-360-degree video signaling. With compatibility between signaling 360-degree video and non-360-degree video information, encoding and decoding of 360-degree video information may be performed using many (e.g., most or all) of the coding tools used for non-360-degree video information, and possibly more coding tools. This disclosure describes one or more example technological solutions to technological problems so that 360-degree video information and non-360-degree video information can be signaled in a compatible manner.

As one example, the example techniques may include a method to signal projection types and related information for 360-degree video information in a syntax structure that includes one or more syntax elements. The syntax structure may also include information for non-360-degree video information. Accordingly, the syntax structure may be a syntax structure that used in signaling non-360-degree video information and can also be used to signal 360-degree video information (e.g., the syntax structure forms part of a standard-conforming bitstream regardless of whether the standard-conforming bitstream includes 360-degree video). For example, the syntax structure may be used for encoding and decoding a bitstream carrying only non-360-degree video data, only 360-degree video data, or both non-360-degree video data and 360-degree video data. Examples of the syntax structures include parameter sets; however, other examples of syntax structures exist, such as those described in more detail below.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for 360-degree video coding (e.g., encoding by video encoder 200 and decoding by video decoder 300). Thus, source device 102 represents an example of a video encoding device, while destination device 116 represents an example of a video decoding device. In other examples, a source device and a destination device may include other components or arrangements. For example, source device 102 may receive video data from an external video source, such as an external camera or external cameras that capture 360-degree video. Likewise, destination device 116 may interface with an external display device, rather than including an integrated display device.

System 100 as shown in FIG. 1 is merely one example. In general, any digital video encoding and/or decoding device may perform techniques described in disclosure. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) for the Versatile Video Coding (VVC) standard under development. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM of VVC. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM of VVC, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM of VVC also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM of VVC provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In one or more examples, video encoder 200 may generate syntax structures that each include one or more syntax elements. In some examples, video encoder 200 may signal, as part of a syntax structure, information for 360-degree video, and signal, as part of the same syntax structure, information for non-360-degree video. Video decoder 300 may receive, as part of a syntax structure, information for 360-degree video, and receive, as part of the same syntax structure, information for non-360-degree video. As noted, the syntax structure includes one or more syntax elements. The syntax elements may together form one or more of: a sequence parameter set (SPS), a SPS extension, a picture parameter set (PPS), a PPS extension, a video parameter set (VPS), a VPS extension, a picture header, a slice header, a tile header, or a supplemental enhancement information (SEI) message.

A PPS is, for example, a syntax structure that contains syntax elements that apply to zero or more entire coded pictures as determined by a syntax element found in each slice segment header. An SPS is, for example, a syntax structure that contains syntax elements that apply to zero or more entire coded video sequences (CVSs) as determined by the content of a syntax element found in the PPS referred to by a syntax element found in each slice segment header. A VPS is, for example, a syntax structure that contains syntax elements that apply to zero or more entire CVSs as determined by the content of a syntax element found in the SPS referred to by a syntax element found in the PPS referred to by a syntax element found in each slice segment header.

In this manner, video encoder 200 may generate a bitstream including encoded video data, e.g., syntax elements describing partitioning of a picture into blocks (e.g., CUs) and prediction and/or residual information for the blocks, including syntax structures that include information for both 360-degree video and non-360-degree video. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

The following describes examples of techniques in accordance with the techniques of this disclosure. The following techniques may be applied independently and/or in combination. As one example, video encoder 200 may signal 360-degree video specific information in a syntax structure, such as a parameter set (e.g., SPS, SPS extension in HEVC, PPS, PPS extension in HEVC, VPS, VPS extension in HEVC). Additional examples of a syntax structure include a picture header, slice header, tile header, or SEI message.

Solely for ease of description, and in no way limiting, the following is described with respect to the SPS extension in HEVC. The techniques may be applied in a substantially similar manner with other syntax structures. Although not required, in some examples, there may be some benefits of using an extension of a parameters set such as SPS extension. For instance, some examples of video decoder 300 may not be configured to process and output 360-degree video. By using an extension of a parameter set, video decoder 300 may be configured to receive all information needed to decode video that is not needed for 360-degree video. For instance, if information for 360-degree video were included before other types of information such as height and width of the picture, some examples of video decoder 300 may not be able to parse through the 360-degree video syntax elements and generate an error. However, by using an extension, such as SPS extension, video decoder 300 may receive information needed to decode most types of video.

Moreover, by using a parameter set such as the example parameter sets described in this disclosure, it may be possible to use the same parameter set that is used even where 360-degree video is not included in the bitstream. Accordingly, video encoder 200 may be configured to signal and video decoder 300 may be configured to receive, as part of the syntax structure that is used even when 360-degree video is not included, information indicating that the coded bitstream includes 360-degree video. For instance, the syntax structure may be a syntax structure that used in signaling non-360-degree video information and can also be used to signal 360-degree video information. Accordingly, the syntax structure forms part of a standard-conforming bitstream regardless of whether the standard-conforming bitstream includes 360-degree video. For example, the syntax structure may be used for encoding and decoding a bitstream carrying only non-360-degree video data, only 360-degree video data, or both non-360-degree video data and 360-degree video data.

Video encoder 200 and video decoder 300 may use extension mechanism such as Sequence Parameter Set (SPS) extension (e.g., SPS extensions bits in H.265) to indicate that the coded bitstream is a 360-degree video bitstream. Using this extension mechanism may allow the 360-degree video and non-360-degree video information to be signaled in the same parameter set.

As one example, when the SPS extension bit indicates that the bitstream is a 360-degree bitstream, projection type of the 360-degree video may be signaled. Examples of the projection type include equiretangular projection (ERP), cubemap projection (CMP) and its derivative projections such as adjusted cubemap (ACP) and equatorial cylindrical projection (ECP). In some examples, for each projection type, further information may be signaled. As one example, a packing arrangement for the geometry projection, or rotation degrees for faces of the geometry projection may be signaled. For example, for cubemap projection, video encoder 200 may further signal and video decoder 300 may receive packing arrangement of the cube face (e.g., in 3×4 or 2×3 arrangement) and also rotation degree of each face.

In some examples, instead of or in addition to the SPS or SPS extension, one or more bits may also be signaled in Video Parameter Set (VPS) to indicate 360-degree video bitstream. Such signaling in the VPS may be conveyed using currently reserved bits to avoid interference with non-360-degree video bitstream.

Tables below exhibit example of signaling the 360-degree projection information in SPS extension. As one example, in the example syntax structure shown in Table 1 includes the syntax element: sps_360Video_extension_flag. The sps_360Video_extension_flag is one example of information for 360-degree video (e.g., information indicating whether a coded bitstream includes 360-degree video). As indicated in Table 1, if sps_360Video_extension_flag is true (e.g., the information indicates that the coded bitstream includes 360-degree video), then the example syntax structure includes additional information for 360-degree video (e.g., the syntax elements for sps_360_Video_extension( ). Accordingly, the sps_360Video_extension_flag is an example of a syntax element indicating whether a coded bitstream includes 360-degree video. Based on the coded bitstream including 360-degree video, the syntax structure (e.g., sps_extension) information for the 360-degree video (e.g., the bitstream includes sps_360_Video_extension( ) based on whether sps_360Video_extension_flag is true or false).

TABLE 1

|  | Descriptor |
|---|---|
| seq_parameter_set_rbsp( ) { | |
| ... | |
|   sps_extension_present_flag | u(1) |
|   if( sps_extension_present_flag ) { | |
|     sps_range_extension_flag | u(1) |
|     sps_multilayer_extension_flag | u(1) |
|     sps_extension_6bits | u(6) |
|   } | |
|   if( sps_range_extension_flag ) | |
|     sps_range_extension( ) | |
|   if( sps_multilayer_extension_flag ) | |
|     sps_multilayer_extension( ) /* specified in Annex F */ | |
|   if( sps_360Video_extension_flag) | |
|     sps_360Video_extension( ) | |
|   if( sps_extension_6bits ) | |
|     while( more_rbsp_data( )) | |
|       sps_extension_data_flag | u(1) |
|   rbsp_trailing_bits( ) | |
| } | |

TABLE 2

|  | Descriptor |
|---|---|
| sps_360Video_extension( ) { | |
|   geometry_type | u(4) |
|   while( more_rbsp_data( )) | |
|     sps_360VideoExtension_data_flag | u(1) |
|   rbsp_trailing_bits( ) | u(1) |
| } | | geometry_type specifies geometry projection of the 360-degree video.

As indicated in Table 2, if sps_360Video_extension_flag is true, then the bitstream includes sps_360_Video_extension( ) which includes syntax element that specifies the geometry projection. Accordingly, in one or more examples, based on the syntax element indicating that the bitstream includes information for 360-degree video (e.g. based on sps_360Video_extension_flag being true), video encoder 200 signals and video decoder 300 receives information indicating a geometry projection (e.g., signals or receives geometry_type).

In the example of Tables 1 and 2, sps_360Video_extension_flag, sps_360_Video_extension( ) and geometry_type are described as being part of the same syntax structure (e.g., SPS extension). However, the example techniques are not limited. In some examples, a syntax element like sps_360Video_extension_flag may be in a first syntax structure, and if true, indicates to receive information from a different syntax structure (e.g., sps_360_Video_extension( ) is in a different syntax structure. Also, it may be possible for a syntax element like geometry_type to be in yet another different syntax structure.

Therefore, video encoder 200 may signal and video decoder 300 may receive information indicating the geometry projection, as part of the same syntax structure, as the information for the 360-degree video, or as part of a different syntax structure. Similarly, video encoder 200 may signal and video decoder 300 may receive, as part of the same syntax structure or different syntax structure, one or more of information indicating a packing arrangement for the geometry projection, or rotation degrees for faces of the geometry projection. It should be understood that packing arrangement and rotation degrees for faces are merely two non-limiting examples of additional information for 360-degree video that may be signaled and received in various different syntax structures. Other examples are contemplated and included as part of this disclosure.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
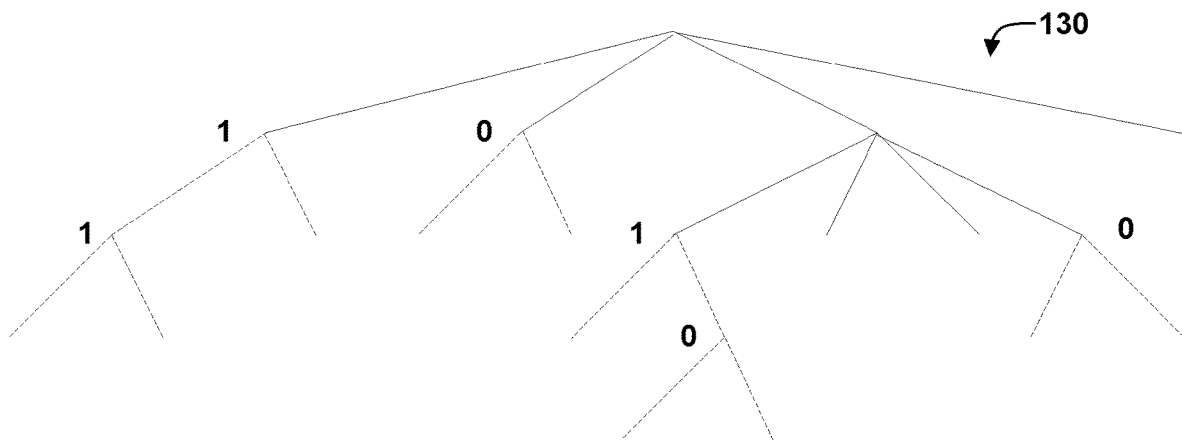
FIGS. 2A and 2B are conceptual diagrams illustrating an example quadtree binary tree (QTBT) structure, and a corresponding coding tree unit (CTU).
Figure 2B:
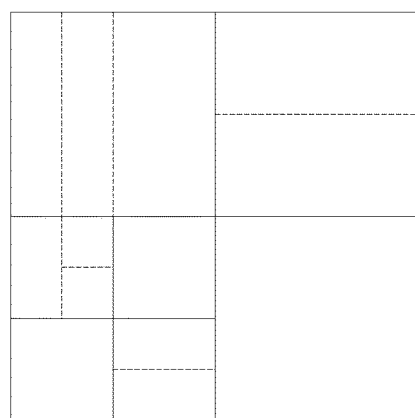

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
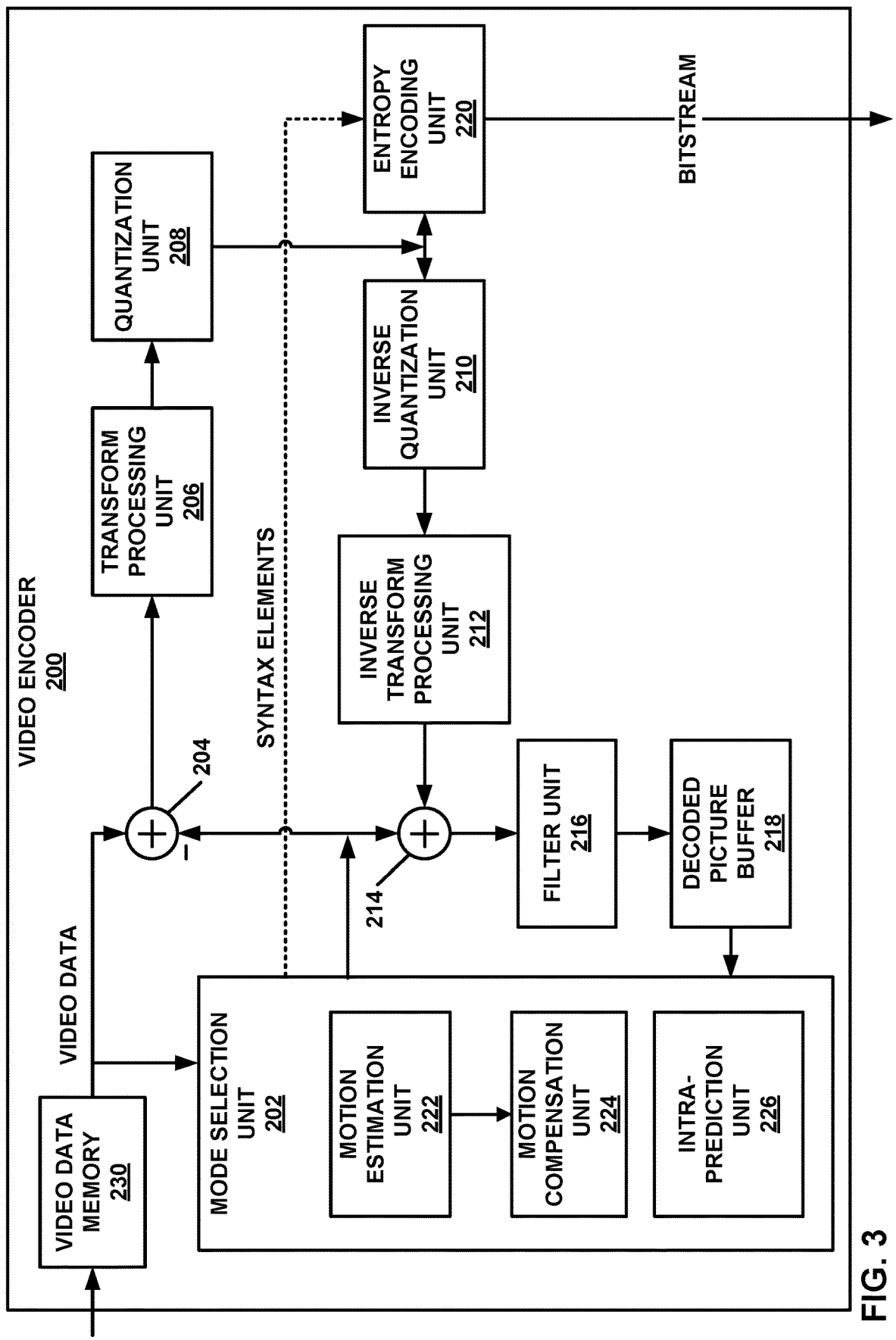
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, linear model (LM) mode coding, 360-degree video coding as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to signal, as part of a syntax structure, information for 360-degree video, and signal, as part of the same syntax structure, information for non-360-degree video. For instance, video encoder 200 may signal, as part of a syntax structure, information indicating that a coded bitstream includes 360-degree video (e.g., the sps_360Video_extension_flag), and signal, as part of the same syntax structure or different syntax structure, information for the 360-degree video based on the bitstream including 360-degree video (e.g., sps_360_Video_extension( ) is signaled based on sps_360Video_extension_flag being true).

Video encoder 200 may signal, as part of the same syntax structure, information for non-360-degree video (e.g., the syntax elements shown in Table. 1). In some examples, video encoder 200 may be configured to signal, as part of the syntax structure that is used even when 360-degree video is not included, information indicating that the coded bitstream includes 360-degree video. Accordingly, the syntax structure may be a syntax structure that used in signaling non-360-degree video information and can also be used to signal 360-degree video information. For example, the syntax structure forms part of a standard-conforming bitstream regardless of whether the standard-conforming bitstream includes 360-degree video). For instance, the syntax structure may be used for encoding and decoding a bitstream carrying only non-360-degree video data, only 360-degree video data, or both non-360-degree video data and 360-degree video data.

The syntax structure includes one or more syntax elements that together may form one or more of: a sequence parameter set (SPS), a SPS extension, a picture parameter set (PPS), a PPS extension, a video parameter set (VPS), a VPS extension, a picture header, a slice header, a tile header, or a supplemental enhancement information (SEI) message. As one example, the syntax structure is one or more syntax elements that together form an SPS extension. As one example, the syntax structure is one or more syntax elements that together form a VPS.

In some examples, the information indicating that the coded bitstream includes 360-degree video is an extension bit that is a previously reserved bit of the syntax structure. For instance, in the SPS extension N-bits may be reserved and not assigned for use to any syntax element (e.g., the standard defines N-additional bits that are available within the SPS extension and not assigned to any other syntax element). The information indicating that the coded bitstream includes 360-degree video is one of the N-bits previously reserved for the SPS extension.

In some examples, video encoder 200 may be configured to signal information indicating geometry projection (e.g., as shown in Table 2), as part of the syntax structure, information for the 360-degree video based on the coded bitstream including 360-degree video. Video encoder 200 may also signal information indicating one or more of a packing arrangement for the geometry projection and rotation degrees for faces of the geometry projection.

Video encoder 200 may signal information, as part of the syntax structure, a syntax element indicating whether a bitstream includes additional information for 360-degree video (e.g., signal sps_360Video_extension_flag). If the syntax element indicates that the bitstream includes additional information for 360-degree video (e.g., signal sps_360Video_extension_flag is true), video encoder 200 may signal information indicating a geometry projection (e.g., geometry_type). In one example, video encoder 200 may signal information indicating the geometry projection as part of the same syntax structure that includes sps_360Video_extension_flag. In one example, video encoder 200 may signal information indicating the geometry projection as part of a different syntax structure that includes sps_360Video_extension_flag.

Figure 4:
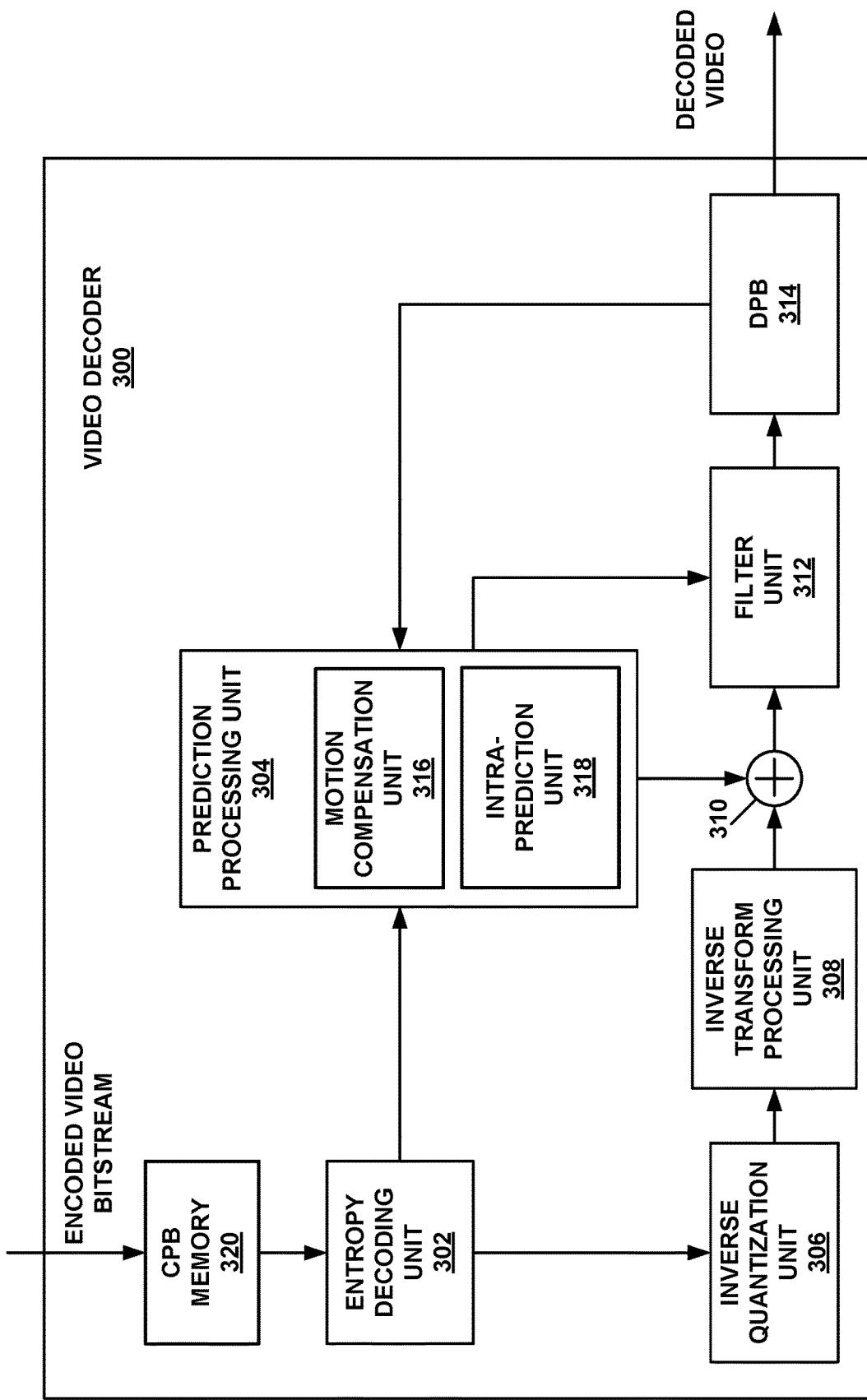
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, 360-degree video decoding unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to receive, as part of a syntax structure, information for 360-degree video, and receive, as part of the same syntax structure, information for non-360-degree video. For instance, video decoder 300 may receive, as part of a syntax structure, information indicating that a coded bitstream includes 360-degree video (e.g., the sps_360Video_extension_flag), and receive, as part of the same syntax structure or different syntax structure, information for the 360-degree video based on the reception of the information that the coded bitstream includes 360-degree video (e.g., sps_360_Video_extension( ) is received based on sps_360Video_extension_flag being true).

Video decoder 300 may receive, as part of the same syntax structure, information for non-360-degree video (e.g., the syntax elements shown in Table. 1). In some examples, video decoder 300 may be configured to receive, as part of the syntax structure that is used even when 360-degree video is not included, information indicating that the coded bitstream includes 360-degree video. As described above, the syntax structure may be a syntax structure that used in signaling non-360-degree video information and can also be used to signal 360-degree video information. For example, the syntax structure forms part of a standard-conforming bitstream regardless of whether the standard-conforming bitstream includes 360-degree video. Accordingly, the syntax structure may be used for encoding and decoding a bitstream carrying only non-360-degree video data, only 360-degree video data, or both non-360-degree video data and 360-degree video data.

The syntax structure includes one or more syntax elements that together may form one or more of: a sequence parameter set (SPS), a SPS extension, a picture parameter set (PPS), a PPS extension, a video parameter set (VPS), a VPS extension, a picture header, a slice header, a tile header, or a supplemental enhancement information (SEI) message. As one example, the syntax structure is one or more syntax elements that together form an SPS extension. As one example, the syntax structure is one or more syntax elements that together form a VPS.

In some examples, the information indicating that the coded bitstream includes 360-degree video is an extension bit that is a previously reserved bit of the syntax structure. For instance, in the SPS extension N-bits may be reserved and not assigned for use to any syntax element (e.g., the standard defines N-additional bits that are available within the SPS extension and not assigned to any other syntax element). The information indicating that the coded bitstream includes 360-degree video is one of the N-bits previously reserved for the SPS extension.

In some examples, video decoder 300 may be configured to receive information indicating geometry projection (e.g., as shown in Table 2), as part of the syntax structure, information for the 360-degree video based on the coded bitstream including 360-degree video. Video decoder 300 may also receive information indicating one or more of a packing arrangement for the geometry projection and rotation degrees for faces of the geometry projection.

Video decoder 300 may receive information, as part of the syntax structure, a syntax element indicating whether a bitstream includes additional information for 360-degree video (e.g., signal sps_360Video_extension_flag). If the syntax element indicates that the bitstream includes additional information for 360-degree video (e.g., signal sps_360Video_extension_flag is true), video decoder 300 may receive information indicating a geometry projection (e.g., geometry_type). In one example, video decoder 300 may receive information indicating the geometry projection as part of the same syntax structure that includes sps_360Video_extension_flag. In one example, video decoder 300 may receive information indicating the geometry projection as part of a different syntax structure that includes sps_360Video_extension_flag.

Figure 5:
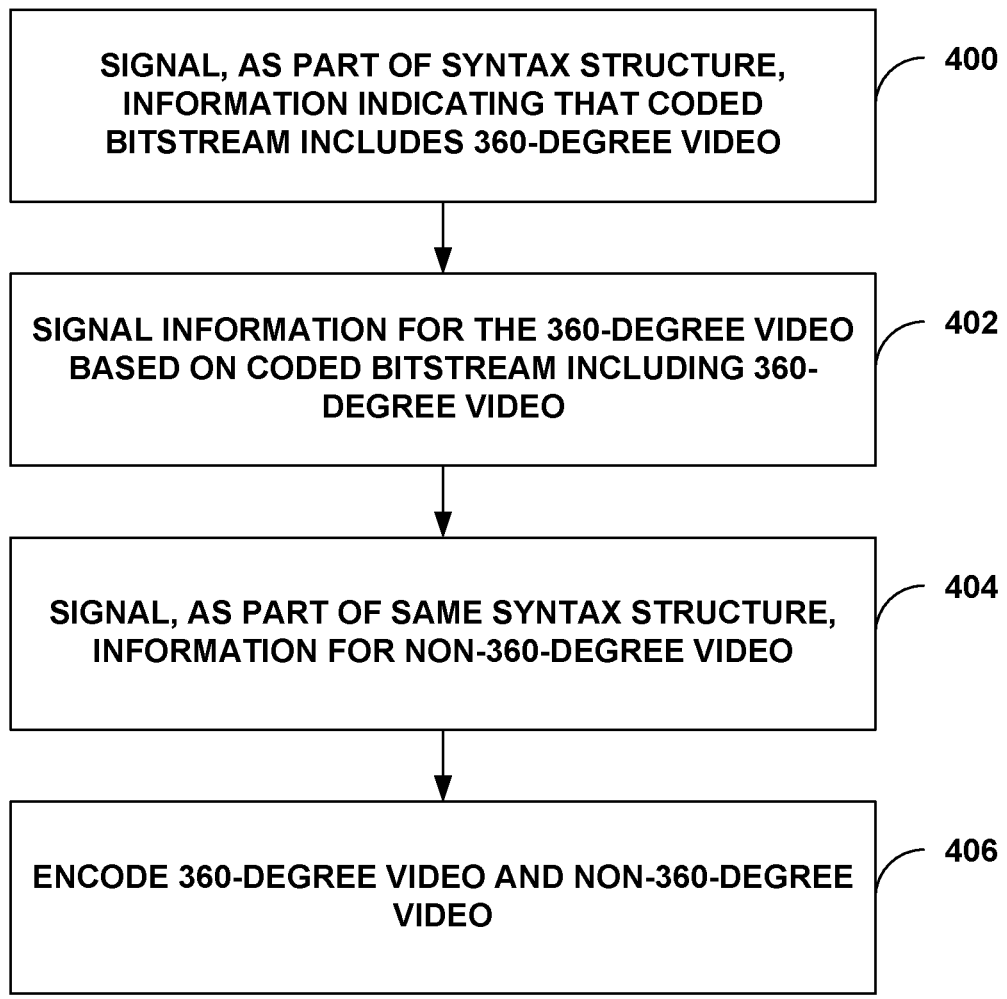
FIG. 5 is a flowchart illustrating an example method of encoding video data.

FIG. 5 is a flowchart illustrating an example method of encoding video data. Video data memory 230 (or some other local memory of video encoder 200 or possibly a memory external to video encoder 200) may store video data of syntax elements of a syntax structure. Video encoder 200 includes one or more processing units implemented in fixed-function or programmable circuitry. Video encoder 200 is configured to signal, as part of a syntax structure, information indicating that a coded bitstream includes 360-degree video (400). For example, video encoder 200 may signal the sps_360Video_extension_flag.

In some examples, the syntax structure includes one or more syntax elements that together form one or more of a sequence parameter set (SPS), a SPS extension, a picture parameter set (PPS), a PPS extension, a video parameter set (VPS), a VPS extension, a picture header, a slice header, a tile header, or a supplemental enhancement information (SEI) message. For example, the syntax structure includes one or more syntax elements that together form a sequence parameter set (SPS) extension. As another example, the syntax structure includes one or more syntax elements that together form a video parameter set (VPS).

The information indicating that the coded bitstream includes 360-degree video may be an extension bit that is a previously reserved bit of the syntax structure. For example, the SPS extension may define N-number of reserved bits that are reserved to be assigned for indicating additional information. The information indicating that the coded bitstream includes 360-degree video may utilize one of these N-number of reserved bits.

In some examples, video encoder 200 may signal, as part of the syntax structure that is used even when 360-degree video is not included, information indicating that the coded bitstream includes 360-degree video. In way, even if video decoder types are not configured to decode 360-degree video, such video decoder types may still be configured to process the syntax structure without outputting an error. Also, if syntax structures like an extension are used, information that video decoder types that do not decode 360-degree video would be received before information for 360-degree video allowing for these video decoder types to operate without error. Accordingly, the syntax structure may be a syntax structure that used in signaling non-360-degree video information and can also be used to signal 360-degree video information (e.g., the syntax structure forms part of a standard-conforming bitstream regardless of whether the standard-conforming bitstream includes 360-degree video). For example, the syntax structure may be used for encoding and decoding a bitstream carrying only non-360-degree video data, only 360-degree video data, or both non-360-degree video data and 360-degree video data.

Video encoder 200 may be configured to signal information for the 360-degree video based on the coded bitstream including 360-degree video (402). For example, video encoder 200 may signal information indicating a geometry projection. Also, video encoder 200 may signal information indicating one or more of a packing arrangement for the geometry projection and rotation degrees for faces of the geometry projection.

In some examples, video encoder 200 may signal information, in the same syntax structure or a different syntax structure, for the 360-degree video based on the coded bitstream including 360-degree video. For example, the information for the geometry projection may be in the same parameter set as the information indicating that the coded bitstream includes 360-degree video (e.g., both are in the SPS extension). As another example, the information for the geometry projection may be in a different parameter set that the information indicating that the coded bitstream includes 360-degree video (e.g., one is in the SPS extension and the other is in the VPS).

Video encoder 200 may be configured to signaling, as part of the same syntax structure, information for non-360-degree video (404). For example, as illustrated in Table 1, video encoder 200 may signal non-360-degree video such as sps_range_extension_flag, sps_multilayer_extension_flag, and their corresponding information when sps_range_extension_flag and/or sps_multilayer_extension_flag are true. Such information for non-360-degree video is in the same parameter set (e.g., SPS extension) as the information indicating that the coded bitstream includes 360-degree video (e.g., sps_360Video_extension_flag).

Video encoder 200 may encode the 360-degree video and the non-360-degree video data (406). For instance, video encoder 200 may utilize techniques of the HEVC standard or those of the VVC standard under development. In some examples, video encoder 200 may determine reference blocks for blocks of video data being encoded, determine residual data between the reference blocks and the blocks being encoded, and signal the residual data along with information to determine the location of the reference blocks.

Figure 6:
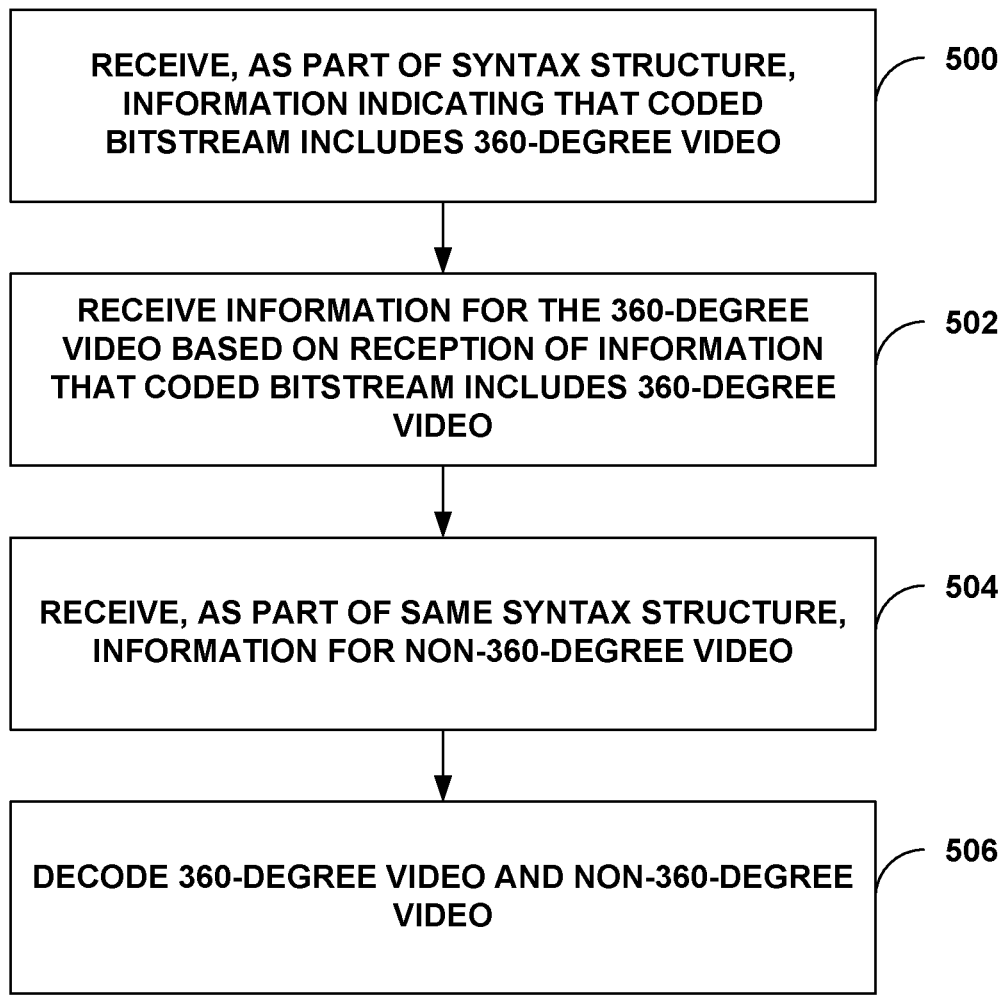
FIG. 6 is a flowchart illustrating an example method of decoding video data.

FIG. 6 is a flowchart illustrating an example method of decoding video data. For instance, a memory (e.g., CPB memory 320, DPB 314, some other local memory of video decoder 300, a memory external to video decoder 300) is configured to store video data. Video decoder 300 includes one or more processing units implemented in fixed-function or programmable circuitry. Video decoder 300 is configured to receive, as part of a syntax structure stored as video data in the memory, information indicating that a coded bitstream includes 360-degree video (500). For example, video decoder 300 may receive the sps_360Video_extension_flag.

In some examples, the syntax structure includes one or more syntax elements that together form one or more of a sequence parameter set (SPS), a SPS extension, a picture parameter set (PPS), a PPS extension, a video parameter set (VPS), a VPS extension, a picture header, a slice header, a tile header, or a supplemental enhancement information (SEI) message. For example, the syntax structure includes one or more syntax elements that together form a sequence parameter set (SPS) extension. As another example, the syntax structure includes one or more syntax elements that together form a video parameter set (VPS).

The information indicating that the coded bitstream includes 360-degree video may be an extension bit that is a previously reserved bit of the syntax structure. For example, the SPS extension may define N-number of reserved bits that are reserved to be assigned for indicating additional information. The information indicating that the coded bitstream includes 360-degree video may utilize one of these N-number of reserved bits.

In some examples, video decoder 300 may receive, as part of the syntax structure that is used even when 360-degree video is not included, information indicating that the coded bitstream includes 360-degree video. In way, even if video decoder types are not configured to decode 360-degree video, such video decoder types may still be configured to process the syntax structure without outputting an error. Also, if syntax structures like an extension are used, information that video decoder types that do not decode 360-degree video would be received before information for 360-degree video allowing for these video decoder types to operate without error. As described above, the syntax structure may be a syntax structure that used in signaling non-360-degree video information and can also be used to signal 360-degree video information. For example, the syntax structure forms part of a standard-conforming bitstream regardless of whether the standard-conforming bitstream includes 360-degree video). Accordingly, the syntax structure may be used for encoding and decoding a bitstream carrying only non-360-degree video data, only 360-degree video data, or both non-360-degree video data and 360-degree video data.

Video decoder 300 may be configured to receive information for the 360-degree video based on the reception of the information that the coded bitstream includes 360-degree video (502). For example, video decoder 300 may receive information indicating a geometry projection. Also, video decoder 300 may receive information indicating one or more of a packing arrangement for the geometry projection and rotation degrees for faces of the geometry projection.

In some examples, video decoder 300 may receive information, in the same syntax structure or a different syntax structure, for the 360-degree video based on the reception of the information that the coded bitstream includes 360-degree video. For example, the information for the geometry projection may be in the same parameter set as the information indicating that the coded bitstream includes 360-degree video (e.g., both are in the SPS extension). As another example, the information for the geometry projection may be in a different parameter set that the information indicating that the coded bitstream includes 360-degree video (e.g., one is in the SPS extension and the other is in the VPS).

Video decoder 300 may be configured to receive, as part of the same syntax structure, information for non-360-degree video (504). For example, as illustrated in Table 1, video decoder 300 may receive non-360-degree video such as sps_range_extension_flag, sps_multilayer_extension_flag, and their corresponding information when sps_range_extension_flag and/or sps_multilayer_extension_flag are true. Such information for non-360-degree video is in the same parameter set (e.g., SPS extension) as the information indicating that the coded bitstream includes 360-degree video (e.g., sps_360Video_extension_flag).

Video decoder 300 may be configured to decode the 360-degree video data and the non-360-degree video data (506). For instance, video decoder 300 may utilize techniques of the HEVC standard or those of the VVC standard under development. In some examples, video decoder 300 may receive information for residual blocks and information to determine location of reference blocks. Video decoder 300 may determine the reference blocks for blocks of video data being decoded and determine the residual data based on the received. Video decoder 300 may reconstruct the blocks of video data based on the reference blocks and the residual data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a coded bitstream that is standard-conforming for non-360-degree video and includes information for non-360-degree video;
   determining, from a syntax structure of the coded bitstream, information indicating that the coded bitstream that is standard-conforming for non-360-degree video further includes 360-degree video;
   parsing information for the 360-degree video subsequent to determining the information that the coded bitstream includes 360-degree video;
   determining, from the same syntax structure, the information for the non-360-degree video; and
   decoding the 360-degree video and the non-360-degree video.

2. The method of claim 1, wherein the syntax structure forms part of a standard-conforming bitstream regardless of whether the standard-conforming bitstream includes 360-degree video.

3. The method of claim 1, wherein the syntax structure comprises one or more syntax elements that together form one or more of:
   a sequence parameter set (SPS);
   a SPS extension;
   a picture parameter set (PPS);
   a PPS extension;
   a video parameter set (VPS);
   a VPS extension;
   a picture header;
   a slice header;
   a tile header; or
   a supplemental enhancement information (SEI) message.

4. The method of claim 1, wherein the syntax structure comprises one or more syntax elements that together form a sequence parameter set (SPS) extension.

5. The method of claim 1, wherein the syntax structure comprises one or more syntax elements that together form a video parameter set (VPS).

6. The method of claim 1, wherein the information indicating that the coded bitstream includes 360-degree video comprises an extension bit of the syntax structure.

7. The method of claim 1, wherein parsing information for the 360-degree video subsequent to determining the information that the coded bitstream includes 360-degree video comprises parsing information indicating a geometry projection.

8. The method of claim 7, further comprising:
   parsing information indicating one or more of a packing arrangement for the geometry projection and rotation degrees for faces of the geometry projection.

9. The method of claim 1, wherein parsing information for the 360-degree video subsequent to determining the information that the coded bitstream includes 360-degree video comprises parsing information, from the same syntax structure or a different syntax structure, information for the 360-degree video subsequent to determining the information that the coded bitstream includes 360-degree video.

10. A method of encoding video data, the method comprising:
    signaling a coded bitstream that is standard-conforming for non-360-degree video and includes information for non-360-degree video;
    including, in a syntax structure, information indicating that the coded bitstream that is standard-conforming for non-360-degree video further includes 360-degree video;
    signaling information for the 360-degree video;
    including, in the same syntax structure, the information for the non-360-degree video; and
    encoding the 360-degree video and the non-360-degree video.

11. The method of claim 10, wherein the syntax structure forms part of a standard-conforming bitstream regardless of whether the standard-conforming bitstream includes 360-degree video.

12. The method of claim 10, wherein the syntax structure comprises one or more syntax elements that together form one or more of:
    a sequence parameter set (SPS);
    a SPS extension;
    a picture parameter set (PPS);
    a PPS extension;
    a video parameter set (VPS);
    a VPS extension;
    a picture header;
    a slice header;
    a tile header; or
    a supplemental enhancement information (SEI) message.

13. The method of claim 10, wherein the syntax structure comprises one or more syntax elements that together form a sequence parameter set (SPS) extension.

14. The method of claim 10, wherein the syntax structure comprises one or more syntax elements that together form a video parameter set (VPS).

15. The method of claim 10, wherein the information indicating that the coded bitstream includes 360-degree video comprises an extension bit of the syntax structure.

16. The method of claim 10, wherein signaling information for the 360-degree video comprises signaling information indicating a geometry projection.

17. The method of claim 16, further comprising:
signaling information indicating one or more of a packing arrangement for the geometry projection and rotation degrees for faces of the geometry projection.

18. The method of claim 10, wherein signaling information for the 360-degree video comprises signaling information, in the same syntax structure of a different syntax structure, for the 360-degree video.

19. A device for decoding video data, the device comprising:
a memory configured to store video data; and
a video decoder comprising one or more processing units implemented in fixed-function or programmable circuitry and configured to:
receive a coded bitstream that is standard-conforming for non-360-degree video and includes information for non-360-degree video;
determine, from a syntax structure of the coded bitstream stored as video data in the memory, information indicating that the coded bitstream that is standard-conforming for non-360-degree video further includes 360-degree video;
parse information for the 360-degree video subsequent to determining the information that the coded bitstream includes 360-degree video;
determine, from the same syntax structure, the information for the non-360-degree video; and
decode the 360-degree video and the non-360-degree video.

20. The device of claim 19, wherein the syntax structure forms part of a standard-conforming bitstream regardless of whether the standard-conforming bitstream includes 360-degree video.

21. The device of claim 19, wherein the syntax structure comprises one or more syntax elements that together form one or more of:
a sequence parameter set (SPS);
a SPS extension;
a picture parameter set (PPS);
a PPS extension;
a video parameter set (VPS);
a VPS extension;
a picture header;
a slice header;
a tile header; or
a supplemental enhancement information (SEI) message.

22. The device of claim 19, wherein the syntax structure comprises one or more syntax elements that together form a sequence parameter set (SPS) extension.

23. The device of claim 19, wherein the syntax structure comprises one or more syntax elements that together form a video parameter set (VPS).

24. The device of claim 19, wherein the information indicating that the coded bitstream includes 360-degree video comprises an extension bit of the syntax structure.

25. The device of claim 19, wherein to parse information for the 360-degree video subsequent to determining the information that the coded bitstream includes 360-degree video, the video decoder is configured to parse information indicating a geometry projection.

26. The device of claim 25, wherein the video decoder is configured to:
parse information indicating one or more of a packing arrangement for the geometry projection and rotation degrees for faces of the geometry projection.

27. The device of claim 19, wherein to parse information for the 360-degree video subsequent to determining the information that the coded bitstream includes 360-degree video, the video coder is configured to parse information, from the same syntax structure or a different syntax structure, for the 360-degree video subsequent to determining the information that the coded bitstream includes 360-degree video.

28. A computer-readable storage medium storing instructions thereon that when executed cause one or more processors of a device for decoding video data to:
receive a coded bitstream that is standard-conforming for non-360-degree video and includes information for non-360-degree video;
determine from a syntax structure of the coded bitstream, information indicating that the coded bitstream that is standard-conforming for non-360-degree video further includes 360-degree video;
parse information for the 360-degree video subsequent to determining the information that the coded bitstream includes 360-degree video;
determine, from the same syntax structure, the information for the non-360-degree video; and
decode the 360-degree video and the non-360-degree video.

29. The computer-readable storage medium of claim 28, wherein the syntax structure forms part of a standard-conforming bitstream regardless of whether the standard-conforming bitstream includes 360-degree video.

30. The computer-readable storage medium of claim 25, wherein the instructions that cause one or more processors to parse information for the 360-degree video subsequent to determining the information that the coded bitstream includes 360-degree video comprise instructions that cause one or more processors to parse information indicating a geometry projection.

* * * * *